United States Patent
Juvonen et al.

[15] 3,693,374
[45] Sept. 26, 1972

[54] VARIABLE TEMPERATURE COOLING APPARATUS

[72] Inventors: Toivo A. Juvonen, Quincy; Gene A. Robillard, Stoneham, both of Mass.

[73] Assignee: Honeywell Inc., Minneapolis, Minn.

[22] Filed: Nov. 18, 1970

[21] Appl. No.: 90,725

[52] U.S. Cl. ..............................62/514, 165/146
[51] Int. Cl. ...................................F25b 19/00
[58] Field of Search ........62/514, 513, 333; 165/146, 165/86

[56] References Cited

UNITED STATES PATENTS

| | | |
|---|---|---|
| 3,302,703 | 2/1967 | Kelly ..................165/146 |
| 3,190,081 | 6/1965 | Pytryga ................62/514 |
| 3,270,744 | 9/1966 | Katz ....................62/514 |
| 3,483,709 | 12/1969 | Bricker ................62/514 |

*Primary Examiner*—Meyer Perlin
*Attorney*—Charles J. Ungemach, Ronald T. Reiling and George W. Field

[57] ABSTRACT

Variable temperature cooling apparatus in which a cooling element and an element to be cooled are provided with interfitting thermally conducting members arranged so that relative movement between the elements varies the area of contact between the members and hence the rate of heat transfer therethrough. Means for accomplishing the relative movement may be incorporated in or independent of the contact area varying arrangement.

8 Claims, 2 Drawing Figures

PATENTED SEP 26 1972 3,693,374

INVENTORS
TOIVO A. JUVONEN
GENE A. ROBILLARD
BY George W. Field
ATTORNEY

VARIABLE TEMPERATURE COOLING APPARATUS

BACKGROUND OF THE INVENTION

This invention relates generally to the field of cooling apparatus, and more specifically to apparatus for variably cooling radiation detecting means to an operating temperature.

Sensitive infrared detectors require refrigeration to low operating temperatures, and initially low temperatures were provided by cryogenic liquids such as liquified gases at atmospheric pressure. Such gases were normally transported and used in containers known as Dewar flasks or "dewars." A Dewar flask is a double walled container constructed of material having low heat conductivity, such as glass, the space between the walls being evacuated and the walls usually being internally silvered. In detector technology the detector to be cooled is mounted between the walls in the evacuated space usually on a thermally conductive insert in the bottom of the inner wall. The bottom of the outer wall is then provided with an infrared window through which the detector may be irradiated with energy incapable of passing through the dewar body. When the cryogenic liquid is introduced into the dewar, cooling of the detector takes place principally by conduction. The temperature reached is essentially the boiling point of the cryogenic liquid which is substantially constant for normal barometric pressure variations.

It is occasionally desired to be able to vary the temperature of a detector in its dewar over a range of values, rather than operating the detector at a single value, since the detector properties are to a considerable extent functions of temperature. This has been accomplished, even with the rudimentary cooling system just described, by inserting between the dewar walls and electric heater in heat transfer relationship to the detector. By this means the thermal gradient from the detector to the cryogenic liquid is increased, and the detector temperature rises accordingly: no decrease in the detector temperature can be accomplished in this manner, however. This method is wasteful of electrical energy and of cryogenic liquid.

A somewhat similar expedient has been used to get higher detector temperatures than are available in the more rudimentary system. The thermally conducting insert has been changed from a thin plate to a flanged stem sealed by its flange to the inner bottom wall with the stem between the walls: the space between the inner and outer dewar bottoms must be increased for this purpose. An electric heater is mounted on the stem between the detector at one end and the flange at the other. This permits a far greater range of detector temperature, but is even more wasteful of electric power and of cryogenic liquid, and has the further defect of tending to cause boiling of the liquid with the accompanying physical loss of further liquid and added hazard to personnel.

With advancing technology there have been developed mechanical refrigerators having a "cold finger" inserted into a detector dewar instead of using the cryogenic liquid directly. When such a device is used, a separable connection of good thermal conductivity is required between the refrigerator and the detector mount of the dewar. The problem of boiling and liquid loss is obviated, but the system is still wasteful in that a refrigerator of comparatively high capacity is required. A mechanical refrigerator setable to produce any desired temperature within its range is of course of very convenient solution to the problem, but is also very expensive.

BRIEF SUMMARY OF THE INVENTION

In accordance with the invention, an object to be cooled to a low temperature, such as a radiation detector, is mounted between the walls of a dewar on the end of a cylindrical socket of heat conducting material which is sealed at its rim to the inner wall of the dewar and closes the bottom thereof. Projecting from the bottom of a separate container of cryogenic liquid is a plug member of heat conductive material, which is sized to be received in the socket in heat transfer relation thereto, and which may be hollow so that when cryogenic liquid is introduced into the dewar the plug rapidly assumes the temperature of the liquid. Except for the plug member the container may be double walled to act for the most part as a second dewar. The area of contact between the plug and the socket for conductive heat transfer is varied by moving the container up and down within the dewar, which may be accomplished by internal screw threads on the dewar interacting with external screw threads on the container. These screw threads may be integral with or distinct from the variable heat transfer area.

It is a principal object of the invention to provide variable cooling apparatus which uses a cryogenic liquid in a convenient, safe, and economical manner; the desired variation in cooling being accomplished by simple mechanical means.

Various other object, advantages, and features of novelty which characterize our invention are pointed out with particularity in the claims annexed hereto and forming a part hereof. However, for a better understanding of the invention, its advantages, and objects attained by its use, reference should be had to the drawings which forms a further part hereof, and to the accompanying descriptive matter, in which there are illustrated and described certain preferred embodiments of the invention.

DESCRIPTION OF THE PREFERRED EMBODIMENT

Figure 1:
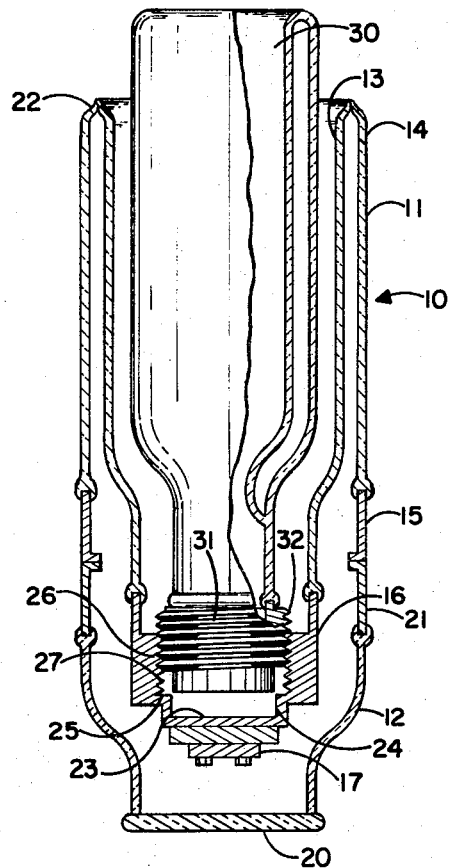
FIG. 1 is a view partly in section of a first embodiment of the invention.

The embodiment of the invention shown in FIG. 1 comprises a dewar 10 made up of a body assembly 11 and a cap assembly 12. Body assembly 11 is made principally of a material of low heat conductivity, such as glass, and has spaced internally silvered inner and outer walls 13 and 14. Outer wall 14 terminates in a ring 15 of material having a coefficient of thermal expansion generally the same as glass, and the bottom of inner wall 13 is closed by a socket 16 of material which can be sealed to glass, has approximately the same coefficient of expansion as glass, and has relatively good thermal conductivity. One suitable material is sold under the trademark "Kavar." A detector 17 to be cooled is secured to the outside of socket 16 in heat transfer relation thereto by any suitable mechanical or adhesive means, and is provided with suitable electrical conductors, not shown, which pass through outer wall 14 at any convenient points, in sealing relation thereto.

Cap 12 is also made principally of glass. Its bottom is closed by a window 20 of material transparent to infrared radiation, such as sapphire, since glass does not transmit infrared radiation effectively. At its upper rim cap 12 terminates in a second ring 21 like ring 15.

Dewar 10 is closed by soldering rings 15 and 21 together, and if desired, they may be provided with flanges for that purpose. The dewar is now evacuated through a tubulature 22 which may then be sealed off or otherwise hermetically closed. The inner surface of socket 16 is preferable flat at the bottom as shown at 23. The bottom is surrounded by a cylindrical wall 24 separated by a ledge 25 from a second cylindrical wall 26 having threads 27.

Detector 17 is cooled by a cryogenic liquid such as liquid nitrogen (LN$_2$) which is contained in a container 30. Container 30 is configured to be received within dewar 10 and essentially comprises a second dewar open at its top and closed at its bottom by a plug 31 which is in thermal engagement internally with the liquid. The lower part of plug 31 is cylindrical with a flat bottom, and is sized to be received within the bottom of socket 16 in radial heat transfer relation with cylindrical wall 24 and axial heat transfer relation with the flat bottom 23. Spaced from the lower end of plug 31 are external threads 32 which engage threads 27.

In operation, when container 30 is first inserted into dewar 10 the only significant heat transfer from socket 16 to plug 31 is by radiation. As threads 27 and threads 32 begin to mesh and the container is screwed further and further into the dewar, greater and greater contact area for conductive heat transfer becomes available. Heat transfer is further increased when the unthreaded cylindrical portion of plug 31 comes into engagement with cylindrical wall 24 while the radiative heat transfer also increases because of the lessened distance involved. Finally, when the two flat surfaces are brought into engagement heat transfer is essentially totally conductive, with maximum contact area, and detector 17 receives its greatest cooling.

A considerable range of temperature is thus made available at detector 17 by the method of varying the efficiency of the heat transfer from the cryogenic liquid. The principal variation is of course in contact area, but some variation is also due to the effect of increased spacing on radiative cooling. The arrangement is most effective when the detector, as irradiated through window 20, requires almost the entire cooling capacity of the apparatus, in its condition of greatest cooling, to maintain a desired minimum temperature. Under these conditions upward displacement of container 30 quickly produces a heat transfer condition in which the temperature of detector 17 rises, the rise being determined by the longitudinal displacement of the container within the dewar.

Figure 2:
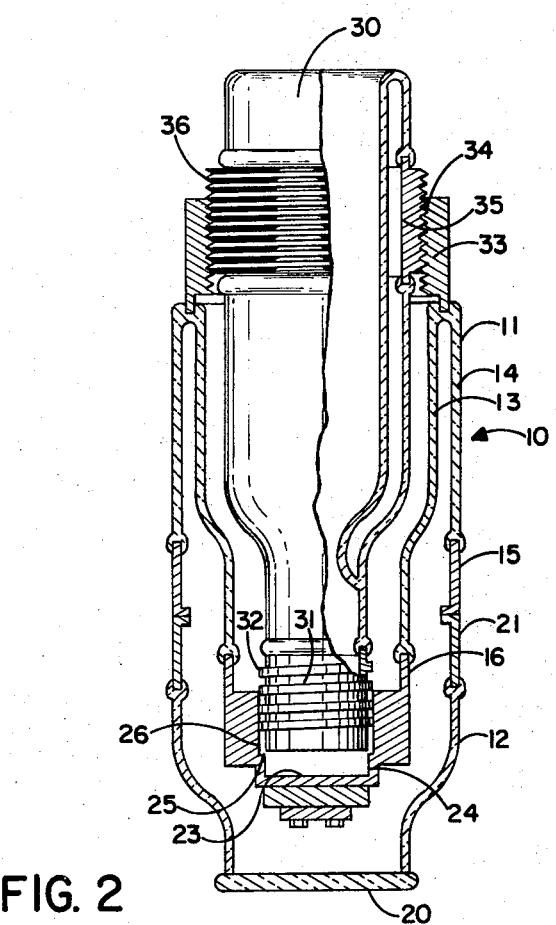
FIG. 2 is a similar view of a second embodiment of the invention.

Referring now to FIG. 2, a second embodiment of the invention is shown. Dewar 10 is made up of a body assembly 11 and a cap assembly 12. Body assembly 11 has spaced internally silvered inner and outer walls 13 and 14. At the top of body assembly 11 is located top portion 33 having threads 34. Outer wall 14 terminates at its bottom in a ring 15 and the bottom of inner wall 13 is closed by socket 16. Detector 17 is secured to the outside of socket 16 and is provided with electrical connectors, not shown, which pass through outer wall 14 at any convenient point.

Cap 12 has its bottom closed by window 20 and at its upper rim cap 12 terminates in ring 21. Dewar 10 is closed by soldering rings 15 and 21 together.

The inner surface of socket 16 is preferably flat at the bottom as shown at 23. The bottom is surrounded by a cylindrical wall 24 separated by a ledge 25 from a second cylindrical wall 26.

Detector 17 is cooled by a cryogenic liquid located in container 30. Container 30 is configured to be received within dewar 10 and essentially comprises a second dewar open at its top and closed at its bottom by plug 31 which is in thermal engagement internally with the liquid. The lower part of plug 31 is cylindrical with a flat bottom and is sized to be received within the bottom of socket 16 in radial heat transfer relation with cylindrical wall 24 and axial heat transfer with the flat bottom 23. Spaced from the lower end of plug 31 are external square threads 32 which threads engage cylindrical wall 26, in socket 16. Located at the top of container 30 is a top portion 35 having threads 36 which threads mesh with threads 34 causing axial movement of container 30 relative to dewar 10 upon rotation of container 30.

In operation, when container 30 is first inserted into dewar 10 the only significant heat transfer from socket 16 to plug 31 is by radiation. As container 30 is further screwed into dewar 10, greater contact area for conductive heat transfer becomes available since more of square thread 32 is in contact with cylindrical wall 26. The contact area is even further increased when the unthreaded cylindrical portion of plug 31 comes into engagement with cylindrical wall 24 while the radiative heat transfer also increases because of the lessened distance involved. Finally, when the two flat surfaces are brought into engagement heat transfer is essentially totally conductive, with maximum contact area, and detector 17 receives its greatest cooling. Container 30 can be screwed out of dewar 10 if it is desired to raise the temperature of detector 17.

While this invention has been described in conjunction with specific embodiments thereof, it is evident that many alternatives, modifications, and variations will be apparent to those skilled in the art in light of the foregoing description. Obviously the "cold finger" of a mechanical refrigerator of fixed capacity may also be given the configuration of a plug 31, or detector 17 can be located elsewhere than at the bottom of the arrangement. Accordingly, it is intended to embrace all such alternatives, modifications and variations as fall within the spirit and broad scope of the appended claims.

I claim as my invention:

1. A variable temperature cooling apparatus comprising, in combination:
   a first hollow elongated heat conducting member having a closed end;
   a heat load mounted on said end;

a second elongated heat conducting member maintained at a desired temperature and located within said hollow heat conducting member in continuous variable area;

means providing a conductive heat transfer path of variable area between said heat conducting members; and means varying the area of contact between said heat conducting members, thereby increasing or decreasing the heat transferred from said heat load to said second heat conducting member.

2. A variable temperature cooling apparatus comprising in combination:

a first elongated hollow dewar having a closed end and an open end, and a heat conducting portion located within said open end;

a heat load mounted on said heat conducting portion;

an elongated heat conducting member maintained at a desired temperature and located within said open end of said dewar, and having a heat conducting end which is in variable area contact with said heat conducting portion of said dewar; and means varying throughout a predetermined range the area of contact between said heat conducting portion and said heat conducting end, thereby increasing or decreasing the heat transferred from said heat load to said second heat conducting member.

3. A variable temperature cooling apparatus comprising in combination:

a first elongated hollow dewar having a closed end and an open end, and a heat conducting portion located within said open end;

a heat load mounted on said heat conducting portion;

a second elongated dewar, maintained at a desired temperature and located within said hollow heat conducting member, including a heat conducting end which is in variable area contact with said heat conducting portion; and means varying the area of contact between said heat conducting portion and said heat conducting end thereby increasing or decreasing the heat transferred from said heat load to said second elongated dewar.

4. The variable temperature dewar arrangement of claim 3 including threads located within said open end of first dewar which mesh with threads located on said second dewar.

5. The variable temperature cooling apparatus of claim 4 wherein said means for varying the area of contact comprises means rotating said second dewar relative to said first dewar thereby providing longitudinal movement of said second dewar relative to said first dewar.

6. The variable temperature dewar arrangement of claim 5 including a spiral thread located on said heat conducting end of said second dewar which threads are in contact with said heat conductive portion of said first dewar.

7. The variable temperature dewar arrangement of claim 3 wherein said heat conducting portion of said first dewar contains threads which mesh with threads located on said heat conducting end of said second dewar.

8. The variable temperature cooling apparatus of claim 4 wherein said means for varying the area of contact comprises:

means rotating said second dewar relative to said first dewar thereby providing longitudinal movement of said second dewar relative to said first dewar.

* * * * *

UNITED STATES PATENT OFFICE
CERTIFICATE OF CORRECTION

Patent No. 3,693,374     Dated September 26, 1972

Inventor(s) Toivo A. Juvonen and Gene A. Robillard

It is certified that error appears in the above-identified patent and that said Letters Patent are hereby corrected as shown below:

Claim 1, line 9, delete ";";

line 10, delete "means providing a";

same line, delete "path of";

line 11, delete "variable area between" and insert --relation to--;

same line, after "said" insert --first--;

same line, delete "members" and insert --member--;

line 13, after "varying" insert --throughout a predetermined range--.

Signed and sealed this 13th day of November 1973.

(SEAL)
Attest:

EDWARD M. FLETCHER, JR.
Attesting Officer

RENE D. TEGTMEYER
Acting Commissioner of Patents